Figure 3:
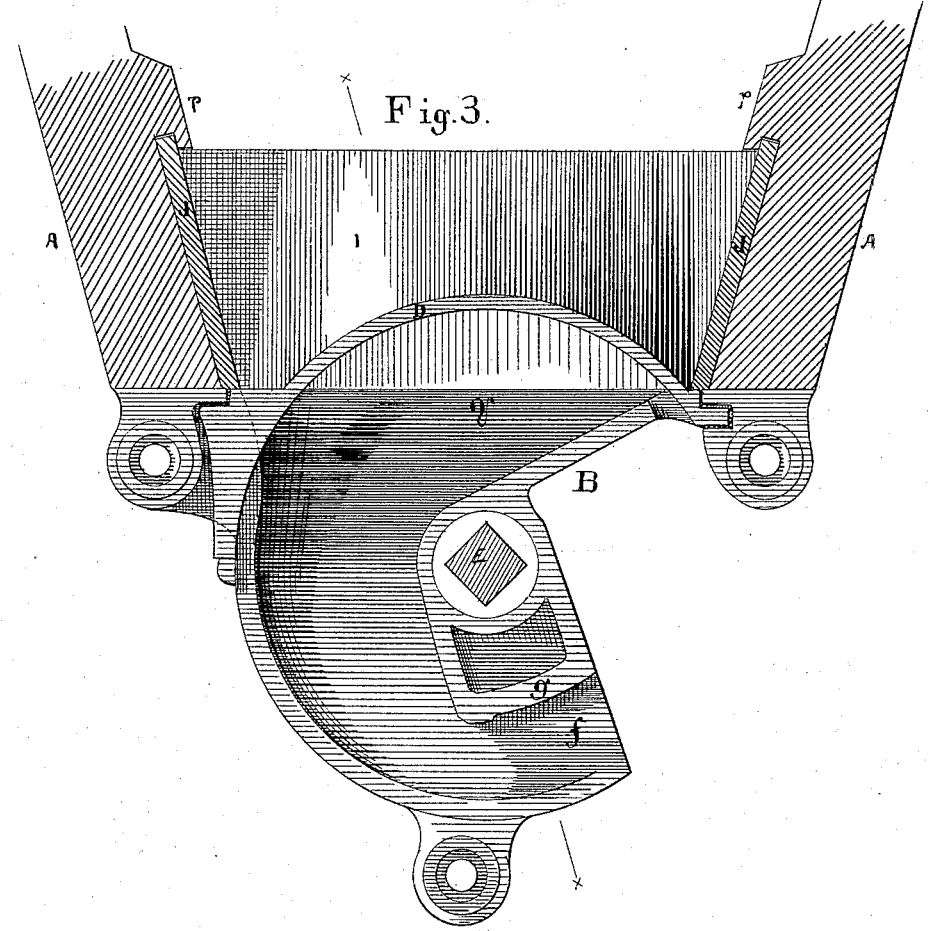

(Model.)
2 Sheets—Sheet 1.
C. E. PATRIC.
FORCE FEED SEEDING MACHINE.
No. 324,722. Patented Aug. 18, 1885.
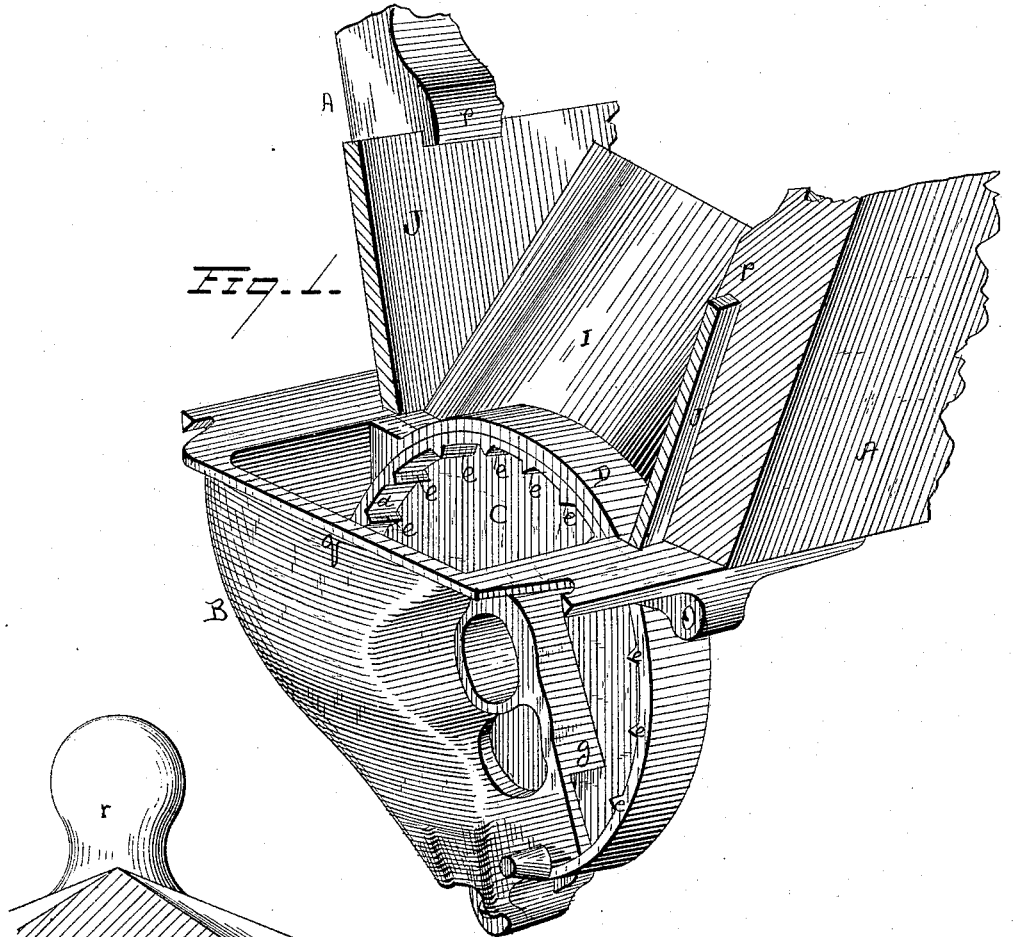
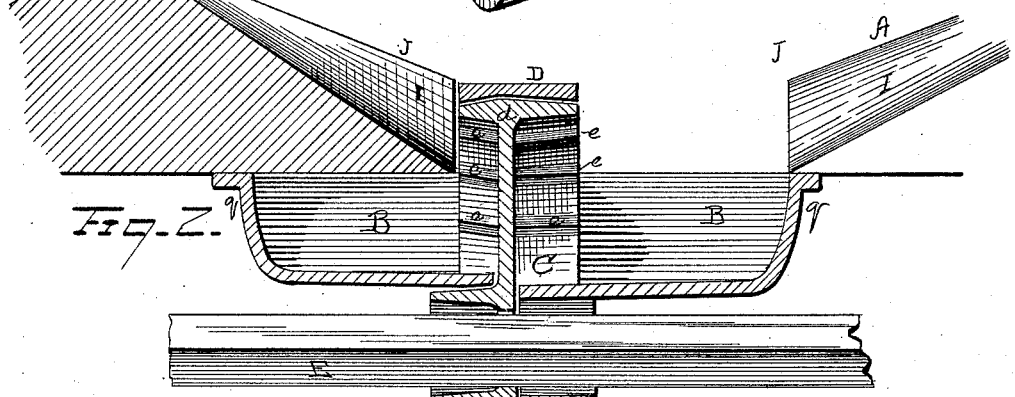
WITNESSES:
Wm. T. Gill.
N. B. Smith.
INVENTOR
C. E. Patric
BY his atty
ATTORNEY
N. PETERS, Photo-Lithographer, Washington, D. C.

(Model.) 2 Sheets—Sheet 2.

C. E. PATRIC.
FORCE FEED SEEDING MACHINE.

No. 324,722. Patented Aug. 18, 1885.

Attest.
R. W. Smith
M. S. Smith

Inventor.
Chas. E. Patric
By his Atty
R. D. O. Smith

UNITED STATES PATENT OFFICE.

CHARLES E. PATRIC, OF SPRINGFIELD, OHIO.

FORCE-FEED SEEDING-MACHINE.

SPECIFICATION forming part of Letters Patent No. 324,722, dated August 18, 1885.

Application filed February 9, 1885. (Model.)

*To all whom it may concern:*

Be it known that I, CHARLES E. PATRIC, of Springfield, in the county of Clark and State of Ohio, have invented new and useful Improvements in Seeding-Machines; and I do hereby declare that the following is a full and accurate description of the same.

My invention belongs to that class of seeding-machines designed to plant the small grains, and relates to that class of devices known as "force feed."

The several varieties of small grains differ much in the character of their exterior surfaces, and require different appliances to insure their proper and uniform removal from the seed-hopper and delivery upon the ground. Those grains which possess the smoothest and hardest cuticle are most easily fed from the hopper, while those grains which are rough or more or less covered with a hairy coat tend to clog and mat together. A variety of oats now in the market, and known as "rust-proof oats," is provided with such an abundance of rough barbs or vegetable hairs that the seeding-machines heretofore known have been unable to plant them with satisfactory uniformity; and my present invention has special reference to devices for properly handling this or similar difficult grains, and thorough experimental trial has proved their efficiency. The difficulty is in causing the grains to descend from the hopper into the feed apparatus, because the tendency to cling and mat together at the bottom under the pressure of the superincumbent mass of grain causes the formation of arches over the feed apparatus. To prevent this formation of arches mechanical agitators of various kinds have been employed; but these are objectionable, because they add mechanism and resistance to be overcome, and they are also in the way when cleaning out the hopper.

The principal object of my invention is to produce a reliable and regular force-feed capable of handling rough and hairy grain without independent mechanical agitators, and the essential feature of it is a force-feed wheel provided with a lateral carrying-flange projecting upward into the hopper, whereby the mass of grain is continually undermined mechanically and carried downward into the seed-cup, instead of depending upon gravity or an independent agitator to cause the grain to descend into a feed-cup below the hopper, and change of feed by changing speed, so as to avoid variations in the size of the measuring-channel. The carrying-flange therefore has a double duty imposed upon it—viz., it acts as an undermining agitator and as a carrying feed-wheel also. So far as I know, these effects have not heretofore been secured by the flanged carrying feed-wheel unless in connection with a variable measuring-channel, whereby barbed grain is impeded in its passage.

I am aware that flanged carrying-wheels have heretofore been placed in feed-cups having discharge-opening invariable in size, different rates of discharge being secured by variations in speed. I am also aware that flanged wheels have been placed in feed-cups whose sides merge without material angle into the discharge-opening on two sides of the same; but movable gates were placed therein and formed a retarding angle at the entrance, and regulated the discharge by variations of size and angle of the measuring-channel. Neither of these is my invention, because the invariable size of the discharge and freedom from angles are essential to the best result.

Incidentally, also, the individual form of the feed-cup and measuring-channel and the hopper-slide in the bottom of the grain-hopper have been improved. These points will be fully described hereinafter.

Figure 4:
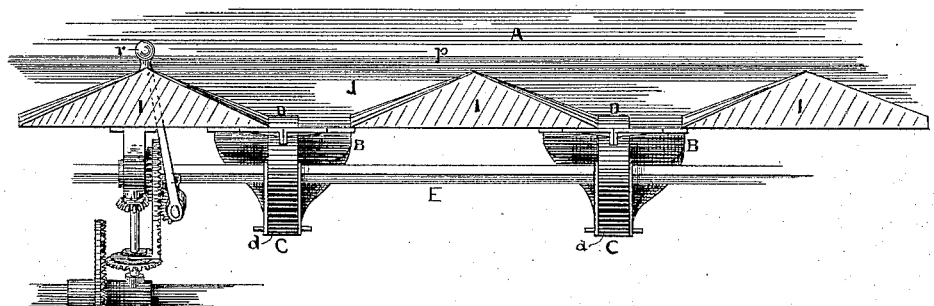

Reference is had to the accompanying drawings, wherein Figure 1 is a perspective view of a feed-cup with its feed-wheel and a portion of the hopper and hopper-slide. Fig. 2 is a vertical section through the center of the feed-cup, and longitudinal as to the hopper. Fig. 3 is a vertical section through the center of the feed cup, transverse as to the hopper, the feed-wheel being removed. Fig. 4 is a longitudinal elevation of a portion of the hopper and feed mechanism, the near side of the hopper being removed, showing a speed-changing mechanism.

A is the hopper, made in the usual form and dimensions. The seed cups B are secured to the bottom of the hopper A at the usual distances apart. The feed-wheel C has the carrying flange *d*, with the interior ribs, *e*, whereby a forward movement is insured for the grain, which falls into said wheel, so as to rest on and be carried by said flange. The size of the measuring-channel $f$ is determined by the width of the lateral flange $d$ and the distance of the abutment $g$ from said flange. As shown in Fig. 2, these dimensions are different on the two sides of the wheel, so that one side is adapted to deliver coarse bulky grains and seeds—such as oats, corn, beans, pease, pumpkin-seeds, &c.—and the other side is adapted to deliver finer and heavier grains, such as wheat and the like. The wheel projects up into the hopper—that is, its periphery is about one inch higher than the upper edge of the cup B—and its periphery is covered by the bridge-plate D, so that there is no contact between the exterior periphery of the flange $d$ and the grain in the hopper, and entrance of solid matter between the wheel and the case to clog the action is prevented. As the diameter of the wheel is not increased, the driving-shaft E is consequently set higher or nearer to the bottom of the hopper to the same extent that the wheel is raised. This is an advantage, because it permits greater space for change-speed gearing, &c.

It has been found by experience that the proper and uniform delivery of the seed depends upon a certain delicate arrangement or relation in form between the feed-wheel, feed-cup, and measuring-channel, and that change of size of the measuring-channel to vary the quantity of seed delivered without changing speed always destroys the relation alluded to, and is correspondingly detrimental to the performance of the feed-wheel. Consequently valves or gates in the measuring-channel have not proven to be satisfactory; but change of quantity by change of speed does not change the relation of parts nor their mutual action. It is therefore a great advantage to change the feed by changing speed, rather than by varying the size of the measuring-channel. The bulky and barbed grains then have their opportunity for free passage without liability to clog, whatever may be the speed. The bottom of the hopper is constituted by a set of sliding blocks, I, which stand transversely as to the hopper and cover one or the other opening into the seed-cup B, so as to exclude the grain therefrom. The blocks I are fashioned on each end to conform to the curve of the bridge D. This is a matter of great importance, as it causes the grain to be delivered into the wheel at the lowest point. The blocks I are at their sides secured to the strips J, which fit the side boards of the hopper A, and are held down by guide-strips $p$, which are secured to the said side boards, so that said strips may slide freely and carry the blocks I forward or backward, as may be required to open or close one side of the seed-cup.

A knob or handle, $r$, attached to one of the blocks I, serves to move the slide as may be desired.

The form of the seed-cup B has also been improved by making the side walls of the upper or mouth portion, $q$, vertical, or nearly so, so that the descent of the grain into the feed-wheel and lower part of seed-cup B, is, so far as possible, unobstructed by friction against the side walls of the seed-cup.

Another improvement in the form of the seed-cup is at the lower portion, where the side walls are fashioned to converge very regularly until they merge without shoulder or abrupt angle into the measuring-channel $f$. This gradual convergence causes the more loose and bulky grain to come in close contact with the carrier-wheel and to form a solid stream through the measuring-channel.

Having described my invention, I claim—

1. Combined with a series of double seed-cups, B, and double-flanged feed-wheels C, projecting upward into the hopper, a series of beveled blocks, I, having the ends rounded to conform to the curve of the bridge D, adapted to deliver grain into the feed-wheel at the lowest possible point.

2. Combined with a series of double seed-cups, B, and double-flanged feed-wheels C, projecting upward into the hopper, a bridge, D, and sliding gate-bottom composed of blocks I having sloping tops and rounded ends, secured to side strips, J, and strips $p$, secured to the hopper-sides to hold the sliding bottom down.

3. Combined with the feed-wheel C, having a laterally-projecting carrying-flange, a cup or casing, B, having a projection, $g$, extending within the flange of said wheel, to constitute a measuring-channel invariable in size, and the side walls gradually converging, and finally merged into the walls of said measuring-channel without abrupt angles, for the purpose set forth.

4. In a force-feed seeding-machine, the following instrumentalities combined: a revolving wheel with a lateral carrying-flange, said wheel set to project upward into the hopper, a discharge-throat invariable in size within the flange of the wheel, and constituted by said wheel and a portion of the stationary seed-cup, and mechanism to vary at will the speed of said feed-wheel.

5. Combined with a series of double seed-cups, B, and double-flanged feed-wheels C projecting upward into the hopper, a bridge, D, and a sliding gate-bottom composed of blocks I, having sloping tops secured to sliding strips J, forming a series of small hoppers adapted to close over one or the other side of said seed-cups, as set forth.

CHARLES E. PATRIC.

Witnesses:
  GEORGE S. DIAL,
  WALTER F. AUSTIN.